Patented Aug. 19, 1952

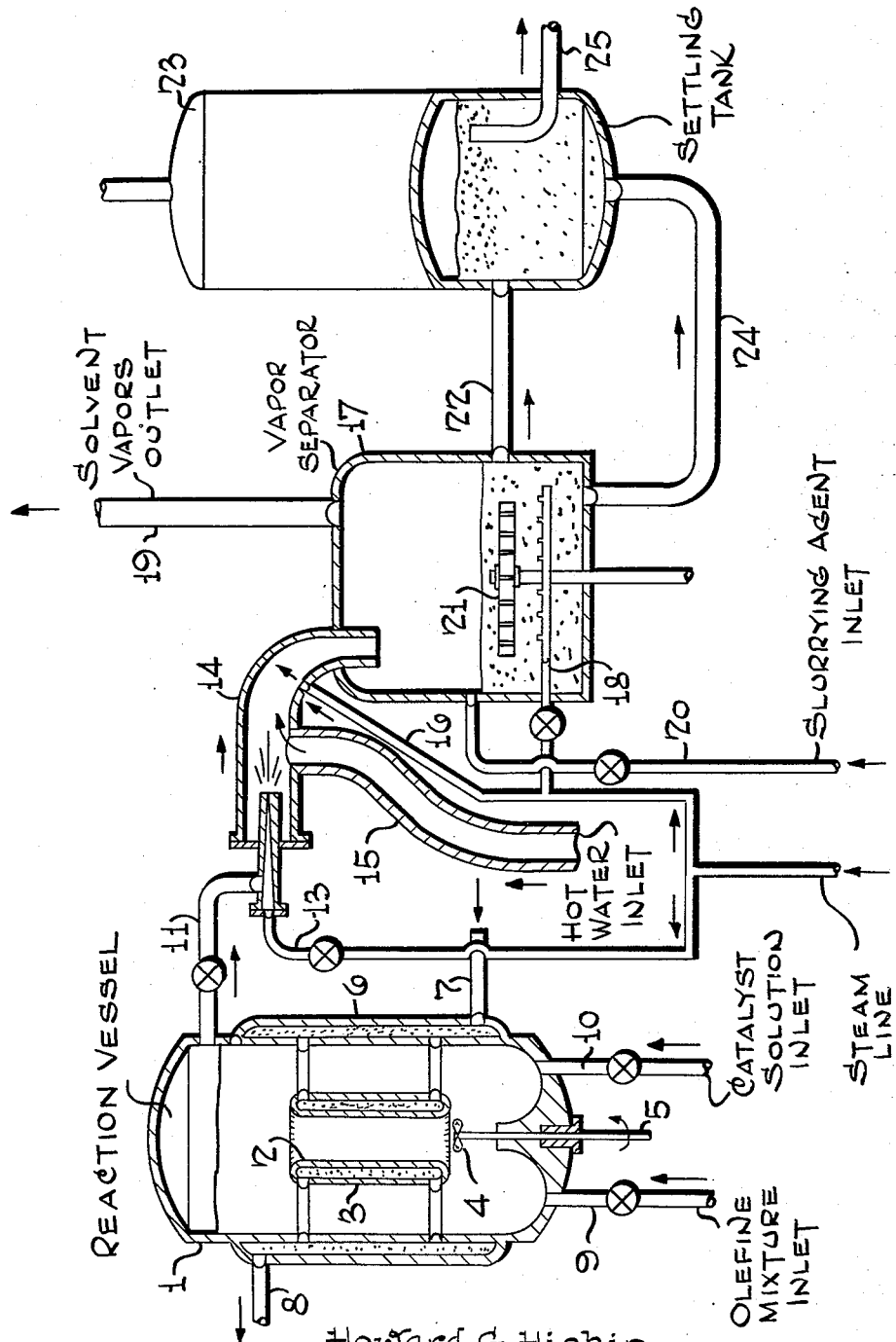

2,607,763

UNITED STATES PATENT OFFICE 2,607,763

METHOD OF SEPARATING ISOBUTYLENE POLYMERS FROM REACTION MIXTURES

Howard G. Hipkin, Cambridge, Mass., and Harry B. Horwitz, Ottawa, Ontario, and Arthur G. Rogers, Sarnia, Ontario, Canada, assignors to Standard Oil Development Company, a corporation of Delaware Application October 16, 1947, Serial No. 780,210

2 Claims. (Cl. 260—85.3)

The present invention relates to the art of producing hydrocarbon polymers of high molecular weight and rubber-like properties. The invention is specifically directed to the handling of the polymerizate as it is withdrawn from the reactor in admixture with solvent at a low temperature. The invention will be fully understood from the description and the drawing.

The drawing is a semi-diagrammatic view in sectional elevation of the apparatus for carrying out the process, illustrating the reaction vessel and the equipment required for preparing an aqueous slurry of the polymer from the reaction mixture of solvent and polymer.

In the production of synthetic resinous and rubber-like polymers by the low temperature technique, the reaction mixture containing polymer more or less completely dissolved in a low boiling point solvent is withdrawn from the reactor at the extremely low temperature of polymerization. The first object of the recovery process is to raise the temperature from the low temperature at which the polymerization takes place, to room temperature. The process of doing this must be carefully controlled in order to avoid fouling of equipment and agglomeration of polymer. It has been found that this can be accomplished best by discharging the mixture into a flowing stream of hot water so as to form an aqueous slurry of the polymer and cause evaporation of the solvent. In this condition the polymer is much less tacky, can be further handed without difficulty by dewatering, slabbing, drying and finally packaging. The most difficult stage of handling is when the solvent-polymer mixture is directly withdrawn from the reactor.

Referring to the drawing, numeral 1 denotes a reaction vessel preferably in the form of an upright cylinder containing a central draft tube 2. The tube is jacketed at 3 for cooling and in its lower end a propeller agitator 4 is placed driven by shaft 5 through the base of the vessel. The sidewalls of the reactor are likewise jacketed at 6 and a cooling medium is admitted by pipe 7 and withdrawn by pipe 8. The polymerizable olefin or olefin mixture with the solvent is continually admitted by pipe 9 and the catalyst solution by pipe 10. It is sufficient here to say that the reaction is conducted at very low temperatures, below —20° F. or —40° F. depending on the particular polymer, by means of a Friedel-Crafts catalyst, such as aluminum chloride, aluminum bromide, boron fluoride and their equivalents, dissolved in inert solvents of low boiling point and low freezing point.

The reactor 1 is kept full so that as the feed is admitted, a part of the reaction bath is simultaneously withdrawn through a short pipe 11 and passed rapidly through a dispersing nozzle 12 by means of an atomizing stream of steam admitted by pipe 13. The atomized mixture of solvent and polymer is discharged directly into a short, large diameter pipe 14 through which a relatively large volume of hot water is continuously flowing, entering at 15 and discharging into a vapor separator 17. Steam is added to the short pipe 14 by means of a line 16 and is also sprayed directly into the separator by pipe 18, and in consequence the polymer mixture is rapidly heated to a temperature of say 140° to 170° which, as will be understood, is well above the boiling point of the solvent.

Solvent vapors pass from the separator by a pipe 19 to recovery equipment, not shown, and a suitable slurrying agent is added to the separator through a pipe 20, so that the aqueous dispersion of the polymer which forms the liquid layer in separator 17 is in a stabilized condition. It is continually agitated by the stirrer 21 and is drawn off by a pipe 22 to a settling tank 23 wherein the dispersion is allowed to cream, the rubber polymer rising to the top on the aqueous liquor forming the lower layer. This latter layer is recycled to the vapor separator 17 by a pipe 24 and the concentrated aqueous dispersion forming the upper layer is removed by pipe 25 for the subsequent operations of dewatering, slabbing, drying, cutting and finally packaging, which steps need not be illustrated since they are well known and form no part of the present invention.

Many different polymers and copolymers may be made by the low temperature technique and consequently can be handled by the present procedure, but in the various cases the conditions of operation, the specific solvent and the like will vary. As a first example may be taken the rubbery copolymers of isoolefins such as isobutene on the one hand with conjugated diolefins of 4 to 8 carbon atoms on the other, such as butadiene-1,3, isoprene, piperylene, and dimethyl butadiene. Such copolymerizations are accomplished at —140 to —160° F. or thereabouts in low boiling hydrocarbon solvents such as butane and pentane or mixtures such as the light naphthas of 4 to 7 carbon atoms. The solutions of such polymers get very viscous so it is well to permit the solution to reach a concentration no greater than 15% by weight and preferably from 4 to 12%. Such a copolymerization is more fully described in issued patents such as U. S. 2,356,128.

Along the same line as the above it will be appreciated that isoolefinic polymers can be handled in the same manner, made by polymerizing isobutene with boron trifluoride at temperature below —20° F. and light hydrocarbon solvents of the types given above. A solution of the same concentration as above is employed.

As an illustration of the use of more resinous material the copolymerization of isoolefins with vinyl aromatics may be considered. Thus isobutene may be copolymerized with styrene to produce tough, resinous material. The temperature of polymerization is from 0° to —100° F. and the proportion of styrene may be from 20 to 70% by weight. The polymerization is conducted in an alkyl halide such as methyl or ethyl chloride or other halides of 3 to 5 carbon atoms. In this case the catalyst is a Friedel-Crafts halide such as aluminum chloride, bromide or boron trifluoride dissolved in the solvent. The concentration of the resin may be as high as 30 to 40% in this case because the polymer makes a much less viscous solution than in the case of materials with more rubbery characteristics. See U. S. 2,274,749.

Another product adaptable to the present method is a resin made by copolymerization of a conjugated diolefin such as butadiene and the like with isoolefin dimers such as di-isobutene. This reaction goes at temperatures of —30 to +10° F. with a Friedel-Crafts catalyst such as aluminum chloride. The solution is an alkyl halide.

While the above are examples, it will be appreciated that they are merely illustrations of the types of materials to which the present process is adaptable, since in each case the polymerization occurs at low temperature, below atmospheric, and in the presence of a solvent, and it is required as a first step to raise the temperature to normal or higher for recovery. In the present process it is extremely important to raise the temperature of the polymer solvent mixture as rapidly as possible from the reactor temperature level to a temperature above the boiling point of the solvent thus giving the mixture the least possible opportunity to form deposits when it is in the most extremely tacky stage and in the presence of the solvent.

For the purpose of causing rapid heating of the polymer solvent mixture, it has been found that the most effective manner is to atomize and distribute the mixture through a large volume of flowing water at a temperature of 140–170° F. or thereabout. In this way the polymer in its most tacky state is kept out of contact with the walls of the vessel and other equipment to the greatest degree possible and it is raised in temperature as rapidly as possible to effect the vaporization of the solvent. The volume of water does not appear to be critical but is conveniently from 5 to 30 times the volume of the cold mixture. In the manner described above, the deposits of polymer and the plugging of the apparatus are greatly reduced, but the lines should be smooth, short and with a minimum number of bends and pockets inviting accumulation, as will be understood.

As an example the following product of an isobutene-isoprene rubbery polymer will be considered. The polymerization takes place at —130° F. and a 4% solution of the rubber in a hydrocarbon solvent is obtained. This mixture was discharged at a rate of 28.9 gal./hr. through a nozzle and atomized with steam using a .66#/- pound of the solution and into a stream of water so as to obtain a slurry containing 2% of rubber. Zinc stearate was added as stabilizer. The operation was continuous, showed no difficulty by nozzle plugging or fouling, and was stopped after 8 hours after demonstration of complete success. The slurry was fine, stable, uniform and practically free of lumps. In many instances it is desirable to add suitable slurrying and inhibiting agents to the hot water stream. These in some manner assist in the dispersion. Among these materials the best appear to be water-insoluble metal soaps such as zinc stearate or other soaps, or the soaps of alminum, magnesia, or calcium.

The present invention is not to be limited by any theory of the operation of the polymerization or to any particular polymerizable ingredients defined, polymerization temperatures or the like, but only by the following claims in which it is desired to claim all novelty inherent in the invention.

We claim:

1. In a process for producing high molecular weight resinous to rubbery hydrocarbon polymers of isobutylene by polymerization at temperatures below —20° F., in the presence of a volatile inert solvent, by a Friedel-Crafts polymerization catalyst, the improved method of recovering the polymers from the cold reaction mixture which comprises atomizing said cold mixture of polymer and solvent by passing it rapidly through an atomizing nozzle by means of an atomizing stream of steam, directly into a flowing stream of hot water having a volume 5 to 30 times the volume of the cold mixture of polymer and solvent, whereby the volatile solvent is vaporized, discharging the mixture into a vapor separation zone, removing solvent vapors from said zone, and withdrawing a slurry of solid polymer particles dispersed in water.

2. A process according to claim 1 applied to the production of a rubbery isobutene-isoprene copolymer at a temperature of about —130° F., and in which the cold mixture of polymer and solvent is atomized through a large volume of flowing water at a temperature of about 140 to 170° F.

HOWARD G. HIPKIN.
HARRY B. HORWITZ.
ARTHUR G. ROGERS.

REFERENCES CITED

The following references are of record in the file of this patent:

UNITED STATES PATENTS

| Number | Name | Date |
|---|---|---|
| 2,276,893 | Thomas | Mar. 17, 1942 |
| 2,360,632 | Mann | Oct. 17, 1944 |
| 2,401,754 | Green | June 11, 1946 |
| 2,455,665 | Ford et al. | Dec. 7, 1948 |
| 2,456,265 | Frolich | Dec. 14, 1948 |
| 2,478,703 | Moore | Aug. 9, 1949 |
| 2,478,718 | Singleton | Aug. 9, 1949 |
| 2,491,752 | Moise | Dec. 20, 1949 |